July 6, 1965 R. W. TOWNSEND 3,192,848
AIR FLOW CONTROL SYSTEM
Filed June 21, 1962 4 Sheets-Sheet 1

Fig.1

INVENTOR.
RICHARD W. TOWNSEND
BY
ATTORNEY

INVENTOR.
RICHARD W. TOWNSEND
BY
ATTORNEY

United States Patent Office 3,192,848
Patented July 6, 1965

3,192,848
AIR FLOW CONTROL SYSTEM
Richard W. Townsend, Scottsdale, Ariz., assignor to The Garrett Corporation, Los Angeles, Calif., a corporation of California
Filed June 21, 1962, Ser. No. 204,228
24 Claims. (Cl. 98—1.5)

This invention relates generally to air supply and control systems for air conditioning and pressurization of enclosures, such as the passenger and pilot compartments of an aircraft. The invention aims to provide a control system for supplying air at a predetermined schedule from an aircraft turbojet or turbofan engine regardless of the flight condition of the aricraft. As used herein, the expression "a predetermined schedule" means a selected mass flow of air per unit of time at certain elevations; for example, the range of from 85 pounds of air per minute at sea level to 70–72 pounds of air per minute at an altitude of 40,000 feet.

Prior to the advent of jet engines for aircraft, the auxiliary power and air supplies were most generally provided by means of independent compressors which could be easily controlled to supply the necessary requirements of air for cabin conditioning and pressurization. With the increasing availability and use in aircraft of jet and turbofan engines, which normally include a plurality of compressor stages, it is desirable for many reasons to obtain the necessary air supply for pressurization and conditioning from the regular compressor stages of the jet engines of the aircraft. Attempts to do this, however, have been restricted to specialized installations where economy of operation in unimportant. This is due primarily to the fact that both the air and pressure requirements and the compressor output vary during different conditions of operation of the aircraft and the turbojet engine. Consequently, it has been necessary to obtain the air supply from the high-speed compressor stages in order that such supply may be adequate at all times. Obviously, this procedure wastes energy when the high-pressure stages provide more air and pressure than is required since the excess has to be dumped overboard. Although consideration has been given to the use of certain lower compression stages where efficiency for most flight conditions would be at an optimum, no means have been available for shifting from such a low-pressure stage to a higher-pressure stage when the former was inadequate for a particular flight condition. Moreover, it is also important to make a smooth transition in any shift from low- to high-pressure stages and vice versa, and such smooth transition is difficult to achieve.

It is therefore a principal object of this invention to provide an improved system and control therefor for supplying air at a predetermined schedule directly from an aircraft turbine engine with maximum efficiency at all flight conditions.

Another object of the invention is to provide a control system for selecting the appropriate source of turbine engine bleed air, and regulating the flow of air in accordance with a predetermined schedule providing maximum efficiency at all flight conditions.

A further object of the invention is to provide a control system for supplying bleed air at a predetermined schedule alternately from low- and high-compression stages so as to obtain the desired flow at all times and all condtions of engine operation.

Still another object of the invention is to provide a control system for supplying bleed air directly from the compression stages of a jet aircraft engine to an air-conditioning and pressurization system at a predetermined schedule under control of a flow sensor and valve, wherein the required air is bled from an intermediate pressure stage for most flight conditions but includes means to shift smoothly to a high-pressure stage when the supply from the intermediate stage is inadequate.

Another object of the invention is to provide a bleed-air control system according to the last preceding paragraph in which the inadequacy of the air supply may be determined either by the degree of opening of the control valve or the pressure condition immediately upstream of said control valve.

The above and other objects of the invention will be apparent from the following description and the accompanying drawings, in which.

In the drawings, the principles of the invention are shown applied to an aircraft having a plurality of turbofan engines, with at least two of said engines having identical air supply control systems associated therewith. Whether operated singly or simultaneously, such an arrangement provides protection against the possibility of failure of one engine with a resulting failure of the entire pressurization and air conditioning system. It will be understood, however, that the invention is not limited in its use to such an arrangement.

The multiple engine air supply system chosen for illustration herein is designed to provide air on a predetermined schedule, which calls for a nominal air flow of about 85 pounds per minute per system at sea level and which varies with altitude to a value of approximately 70 pounds per minute at 40,000 feet. Air flow in such a system may be sensed by a conventional Venturi meter in which:

$$\Delta P = q_2 - q_1$$

$\Delta P$ being the expression for pressure differential and here being the pressure differential between the throat and entrance of the Venturi. For purposes of simplification, it may be assumed in the following analysis that $q_1$ is negligible so that:

$$\Delta P = q_2$$

In this equation, $q_2$ (or $q$) is the dynamic head at the throat of the Venturi meter, and such dynamic head may also be expressed as:

(1) $$q = \frac{\rho V^2}{2g}$$

and the mass flow per unit of time (W) may be expressed as:

(2) $$W = \rho A V$$

in which:

$A$ = Throat cross-sectional area;

$V$ = Velocity; and $\rho$ = Density, which also may be expressed as:

(3) $$\rho = K_1 \frac{P}{T}$$

(where P is the pressure, T is the temperature at the entrance to the Venturi, and $K_1$ is a constant).

Transposing (1) gives:

(4) $$V^2 = \frac{2gq}{\rho}$$

Squaring (2) gives:

(5) $$W^2 = \rho^2 A^2 V^2$$

Substituting $\frac{2gq}{\rho}$ for $V^2$ gives:

(6) $$W^2 = \rho A^2 2gq$$

Substituting $K_1 P/T$ for $\rho$, and realizing $A^2$ and $q$ both as constant, we obtain:

(7) $$W = K_2\sqrt{P/T}$$

Equation 7 is the principal flow equation for the basic control of air flow through the system, and may be further simplified in the present multiple engine arrangement illustrated since the temperature at the inlet to the Venturi will be relatively constant. Therefore, $$W = K_3\sqrt{P}$$

and the flow will thus vary aproximately parabolically with the Venturi inlet pressure.

As mentioned above and shown in FIG. 1, an aircraft 10 may be powered by a plurality of engines, such as first, second and third turbojet or turbofan engines 11, 12 and 13, respectively. These engines are identical in construction and each includes, as an integral part thereof, a fan 14 and a multiple stage compressor having an eighth stage 15 and a high-pressure stage 16, sometimes called "the high spool." With the engine arrangement illustrated, air may be bled from the eighth stage 15 of each of the engines 11 and 13, and flows through conduits or supply pipes 17 and 18, respectively, to a main supply conduit 20, and ultimately to an air conditioning system 21 for the passenger and pilot compartments of the aircraft. Such flow is under the control of a plurality of valves and pneumatic devices which are suitably integrated and constitute the control system of this invention.

Figure 1:
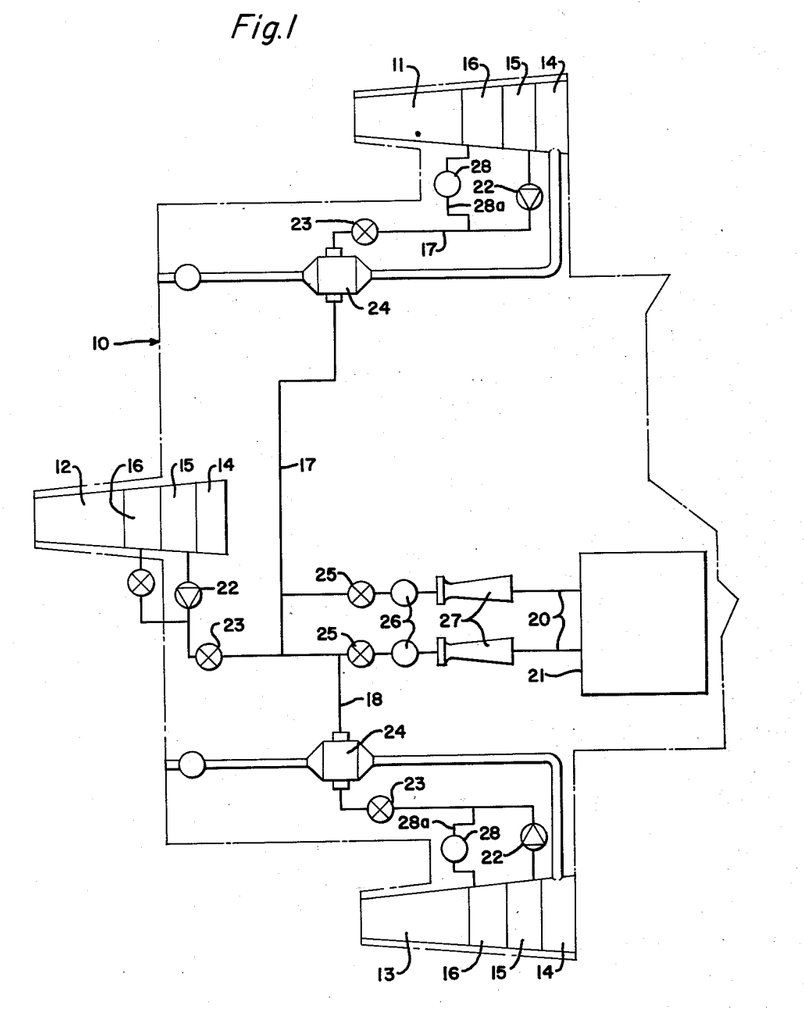
FIG. 1 is a schematic diagram of an arrangement of three turbofan engines and a bleed-air supply system embodying the features of this new invention.

Considering engine 11 as an example, bleed air from the eighth stage 15 flows through a check valve 22, a shutoff valve 23, and if desired, a heat exchanger 24 which is arranged to serve as a precooler and receives cooling air from the fan 14. After joining main supply conduit 20, the air flows through a main shutoff valve 25, a flow regulating valve 26, and a flow sensing Venturi 27 before passing into the main air conditioning system 21. According to the present invention, the bleed air control system selects air from the eighth stage of either engine 11 or 13 to fulfill all of the system air flow requirements as long as the eighth-stage pressure is at or above the requirements of the system. Whenever the output of the eighth stage is insufficient to meet the air conditioning needs or system requirements, the pressure conditions at the flow regulating valve 26 automatically allow air from the high-pressure spool 16 to enter the system through a high-spool modulating valve 28 to supplement the air flow output of the eighth stage. Valve 28 may be arranged in an auxiliary conduit 28a connecting the high-spool stage with the associated supply pipes 17 or 18. If the eighth-stage pressure becomes inadequate, the bleed system will obtain all of its requirements from the high-pressure stage 16 with the check valve 22 preventing reverse flow of the higher pressure, high-spool bleed air into the eighth-stage engine port. The coordination of the various valves and the pneumatic controls for effecting this result will now be described.

Figure 3:
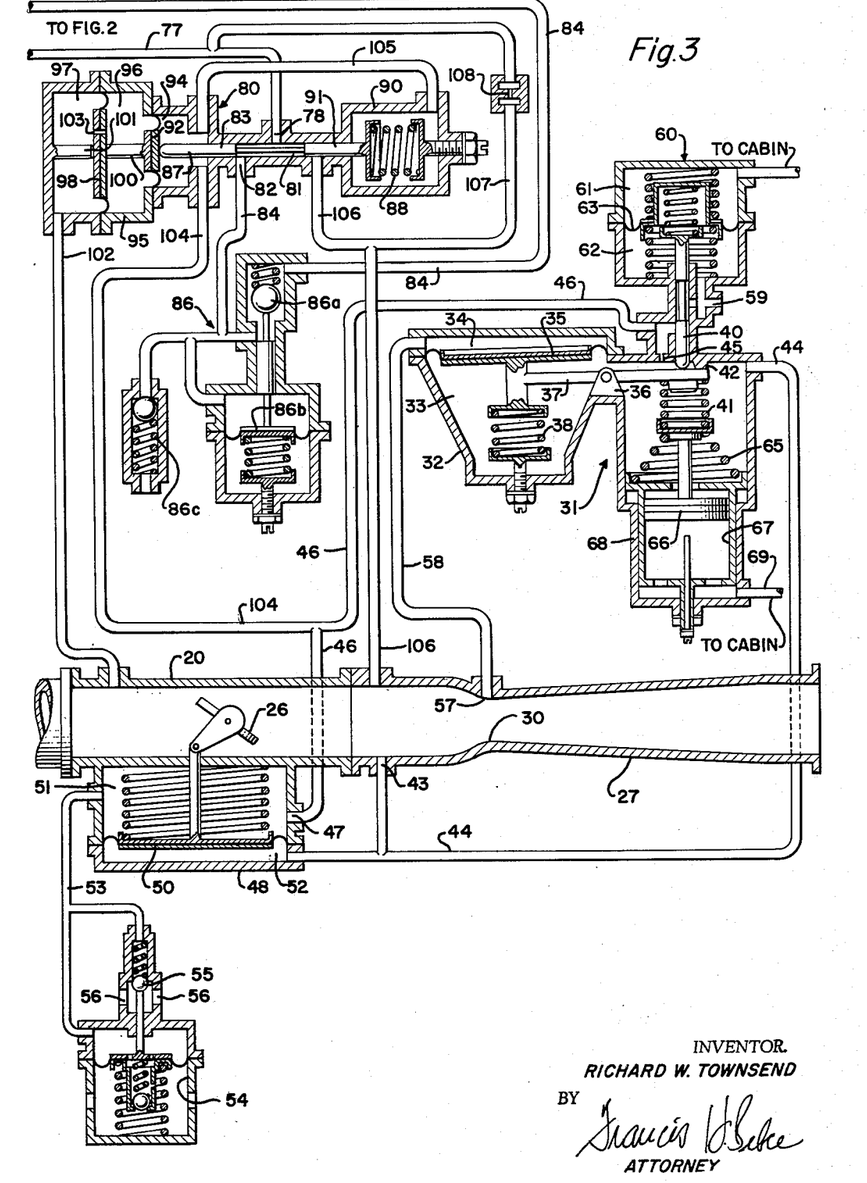

It has been explained above that the rate of air flow through the system is a function of the pressure at the throat of the Venturi sensor 27. This flow sensor is designed to produce a pneumatic signal which, through other pneumatic controls, will modulate the valve 26 so as to control the air flow to the conditioning system 21 at the specified flow schedule. As shown in FIG. 3, said sensor 27, which is inserted in the main supply line 20, comprises a reduced throat section 30 and a pneumatic servo or conrol mechanism which is generally designated by the reference numeral 31. The servo 31 includes a main housing member 32 shaped to form pressure chambers 33 and 34, which are separated by a relatively large, movable wall or diaphragm 35. Chamber 33 may be formed in two sections separated by a fulcrum or pivot support 36 for carrying a movable pivot bar or actuator member 37. One end of the pivot bar 37 is adapted to press against the diaphragm 35 and is resiliently urged in contact therewith by an adjustable spring 38; and the other end of the pivot bar 37 is pressed in resilient contact with a metering spool 40 by a constant rate spring 41.

When the air flow control system is not operating and there is zero pressure at the inlet end of the Venturi 27, the pivot bar 37 will be positioned as shown in FIG. 3, with the right-hand end thereof resting against a stop 42, provided in the housing 32. Operating pressure in the Venturi inlet may be sensed at 43 and transmitted to chamber 33 through a conduit 44. Pressure in chamber 33 causes flow through an orifice 45 into a conduit 46 which is connected to a supply port 47 of an actuator 48 for the modulating valve 26. Actuator 48 is of conventional construction, including a diaphragm 50 which separates the actuator housing into two chambers 51 and 52, with chamber 51 being connected with the supply port 47 and chamber 52 being directly connected to the Venturi inlet sensing conduit 44. The construction is such that a pressure build-up in supply port chamber 51 tends to open the upstream modulating valve 26. In order to control the opening pressure build-up to a predetermined rate, chamber 51 may be vented to the atmosphere or ambient pressure through a conduit 53 having a conventional rate control valve mechanism 54 connected thereto, and including a spring controlled ball valve 55 which connects the conduit 53 with atmospheric pressure through vents 56. This mechanism vents the valve opening pressure to the atmosphere through vents 56 when the rate of opening pressure in chamber 51 exceeds the rate of increase of pressure in the rate chamber of mechanism 54.

Pressure at the throat 30 of the Venturi flow sensor 27 may be sensed at 57 and conducted to the chamber 34 through a conduit 58. Since the chamber 33 is subjected to inlet pressure through conduit 44, it will be understood that the large diaphragm 35 is loaded in an upward direction by the pressure differential across the Venturi, and that the force produced by this loaded diaphragm is a function of the velocity of air flow in the Venturi. Such force causes the pivot bar 37 to move in a clockwise direction and thereby permit the metering spool 40 to drop and bleed off pressure, in conduit 46 and chamber 51, to the atmosphere through a port 59. The amount of bleed and movement of the metering spool will be proportionate to the pressure differential on the diaphragm of the actuator 48 through the conduit connections described above. An increase in the flow through the Venturi flow sensor 27 will cause a higher pressure differential on the large diaphragm 35 with a proportionately greater bleedoff of actuator pressure until the upstream valve 26 closes enough to restore equilibrium. As thus far described, it will be apparent that the control mechanism or servo 31 would seek to maintain a constant pressure differential across the Venturi for all operating conditions of the aircraft.

In order to have the pneumatic signal, produced by the flow sensing Venturi 27, compensate for variations in atmospheric pressure, as well as inlet pressure, metering spool 40 is operatively connected to a biasing mechanism 60. This mechanism, which is another pneumatic actuator, includes a housing separated into a cabin pressure chamber 61 and a vent chamber 62 by a diaphragm 63. As shown in FIG. 3, cabin pressure (which is controlled by a separate regulator, not shown), is sensed on the upper side of the small diaphragm 63 through chamber 61, while atmospheric pressure is sensed on the lower side of the diaphragm, through chamber 62 and vent 59. With the cabin pressure being controlled by a separate regulator, and such pressure generally always being above atmospheric, it will be understood that the downward force generated by this diaphragm is a function of altitude and the setting of the cabin pressure regulator. At higher altitudes, where atmospheric pressure is lower, the increased downward force on the metering spool 40 reduces the pressure to the actuator supply port 47 and thereby reduces the total flow through the main conduit 20. Thus, the force on diaphragm 63 biases the servo-pneumatic controller 31 so as to increase the air flow at lower altitudes and to reduce the flow at higher altitudes, as required, to meet the predetermined flow schedule.

It is desirable, however, to maintain the weight of air flow into the air conditioning system 21 substantially constant, irrespective of changes in upstream or downstream pressure such as may be caused downstream by variations in flow restrictions at the air conditioning system. In order to accomplish this, the pivot bar 37, which is subjected at the lower side of the right-hand end thereof to the upward force produced by the constant rate spring 41, is further urged upwardly by a variable rate spring 65, and a movable wall or piston 66 which is disposed for sliding movement in an adjustable carrier 67. In the form shown, this carrier is cylindrical in shape and slidably mounted in a correspondingly shaped housing or casing 68, formed on or as part of the housing 32. The lower side of the piston 66 is subjected to cabin pressure through a sensing conduit 69 which is connected to the lower part of housing 68, suitable openings in the carrier 67 permitting such pressure to reach said piston 66. In this way, cabin pressure may be used as a nearly constant, absolute pressure reference.

If the pressure in the inlet of the Venturi sensor 27 is increased relative to the cabin pressure, as by turning off one branch of the air conditioning system, the pressure will increase in chamber 33 on the upper side of the piston 66 and said piston will move downwardly. Such movement will relieve a part of the preload on the constant rate spring 41 located between the piston and the pivot bar 37. This unbalances the pivot bar and allows the metering spool to lower slightly and thereby bleed off the actuator pressure until the upstream valve 26 closes sufficiently to restore equilibrium. The action of the large diaphragm 35 continues to maintain a constant pressure differential in the Venturi sensor 27, as explained above. This differential, however, will be at a different level as modified by the change of load on the constant rate spring 41 caused by the movement of the piston 66. It will be understood that by using the proper variable rate spring 65, it is possible to maintain a constant weight of air flow through the Venturi sensor 27, regardless of upstream or downstream pressure variations. This portion of the device thus constitutes a means for compensating for changes in pressure either upstream or downstream of the Venturi 27.

Since the air supplied from the eighth-stage compressor 15 of the engine may not always be adequate to meet the predetermined flow schedule, as governed by the air conditioning and pressure requirements, the present invention provides a means for automatically switching to and from the high-pressure or high-spool compressor bleed 16 as engine conditions vary in order to maintain the desired ventilation rate to the cabin. The switch-over from eighth stage to high spool preferably should be of such a nature that the lower-pressure, eighth-stage bleed is utilized as much as possible in order to provide minimum aircraft penalty and maximum economy; and in addition, any switch-over should be gradual and smooth. Furthermore, as the switch-over takes place, flow modulation should also be transferred from the downstream control valve 26 to the modulating valve 28 in the high-speed bleed line, as will now be described.

Insufficient air flow through the main conduit 20 to the air conditioning unit 21 will be apparent both from the degree of opening of the modulating valve 26 and from the low-pressure condition at the upstream side of the Venturi sensor 27. It would, therefore, be possible to control the opening of the high-spool valve 28, either by the position of the actuator 48 which could be used to control a metering valve, or by a pneumatic control. For the purpose of illustration, the latter type is shown in FIGS. 2 and 3.

Figure 2:
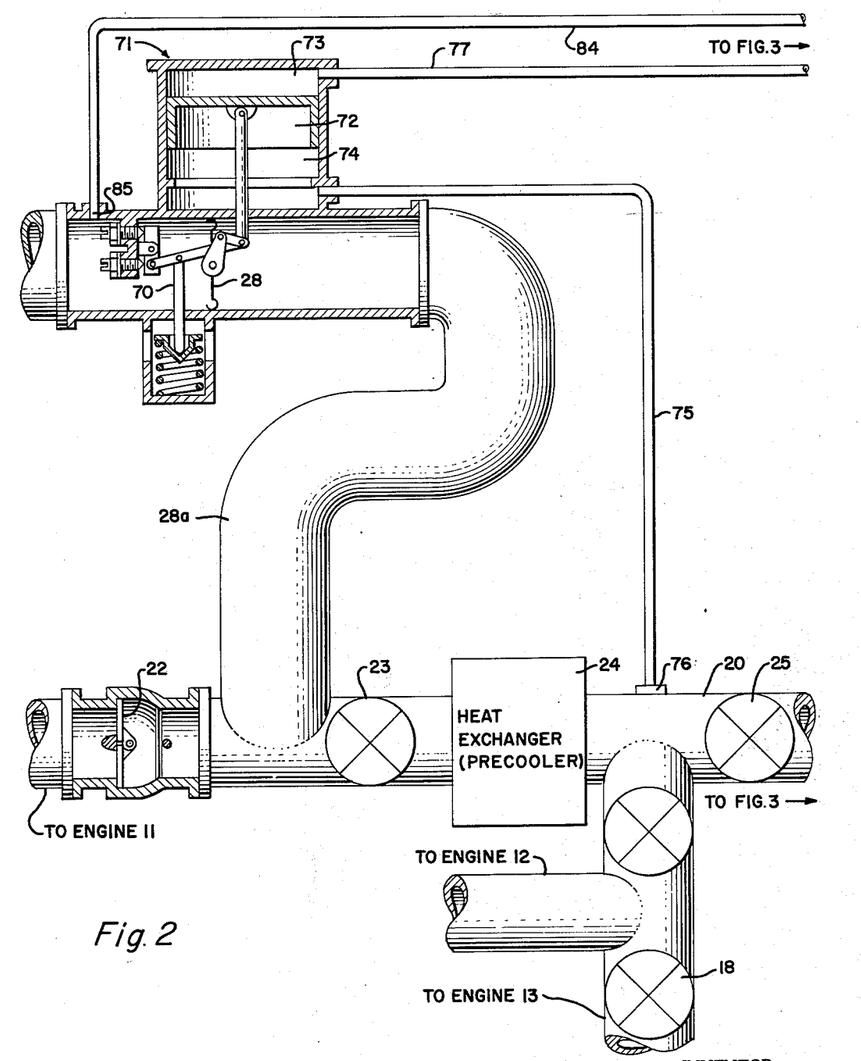
FIGS. 2 and 3 are schematic views which when placed together show the details of the valves and pneumatic controls for the air supply system.

In FIG. 2 (and FIGS. 4 and 5) it will be noted that the valve 28 is resiliently and adjustably urged toward closed position by a spring-pressed lever device 70 and a piston actuator 71 having a piston 72 which separates the actuator housing into upper and lower pressure chambers 73 and 74, respectively. The lower chamber 74 is connected by a conduit 75 with a sensing port 76 which communicates with the main supply conduit 20 between the shutoff valve 25 and the high-spool valve 28. Upper chamber 73 is connected by a conduit 77 to an outlet port 78 of a differential pressure control device or apparatus 80, as shown in FIG. 3. Outlet port 78 is formed in the wall of a modulating valve chamber 81 which is also provided with a pressure inlet port 82 under the control of a modulating valve 83. Controlled pressure is supplied to the valve chamber 81 and inlet port 82 through a pressure supply conduit 84. This conduit extends from an inlet port 85 at the upstream side of the high-pressure spool valve 28, as shown in FIG. 2, to said port 82, and may be provided with an adjustable regulator 86, if desired, to maintain the pressure in the system at any desired level below that of the high pressure stage 16. The regulator shown schematically in FIG. 3 includes a valve 86a inserted in the line 84 and under the control of an adjustable diaphragm 86b exposed to pressure at the outlet side of valve 86a. The regulator also may have a suitable relief valve 86c.

Modulating valve 83 is provided with a stem 87 at the left-hand end thereof, and said stem is resiliently urged to the left by an adjustable spring 88 contained in a housing 90 and operatively connected with a right-hand valve stem or land 91 extending into said housing 90. Spring 88 resiliently urges stem 87 into contact with a movable wall or diaphragm 92 which separates a pressure differential chamber 94 from a main differential pressure housing 95, and forms one wall of said housing. This housing is divided into right and left chambers 96 and 97, respectively, by a large anticipator diaphragm 98. Diaphragm 98 is operatively connected with diaphragm 92 by a shaft 100 for simultaneous movement therewith, and is limited in its movement to the left by a stop 101 in chamber 97 when there is a sudden drop in pressure in chamber 97, as will presently be explained.

Pressure conditions immediately upstream of the modulating valve 26 are transmitted to left-hand chamber 97 by a conduit 102, and thence to the right-hand chamber 96 through an orifice 103 provided in the large diaphragm or movable wall 98. Chamber 94, on the right-hand side of the small diaphragm 92, is subjected to the pressure conditions existing in actuator chamber 51 by a conduit 104 which extends from the wall of the chamber 94 to the conduit 46 leading to port 47 and chamber 51 of the actuator 48. If desired, this same pressure condition may be transmitted to the housing 90 through a conduit 105 so as to act against the right-hand valve stem 91 and the parts associated therewith. Thus, the pressure conditions in chambers 94 and 96 will affect diaphragm 92 and said diaphragm will be under the control of the pressure differential existing across the modulating valve 26, which is the same as that between the immediate upstream side of the modulating valve 26 and the valve actuating chamber 51.

Figure 4:
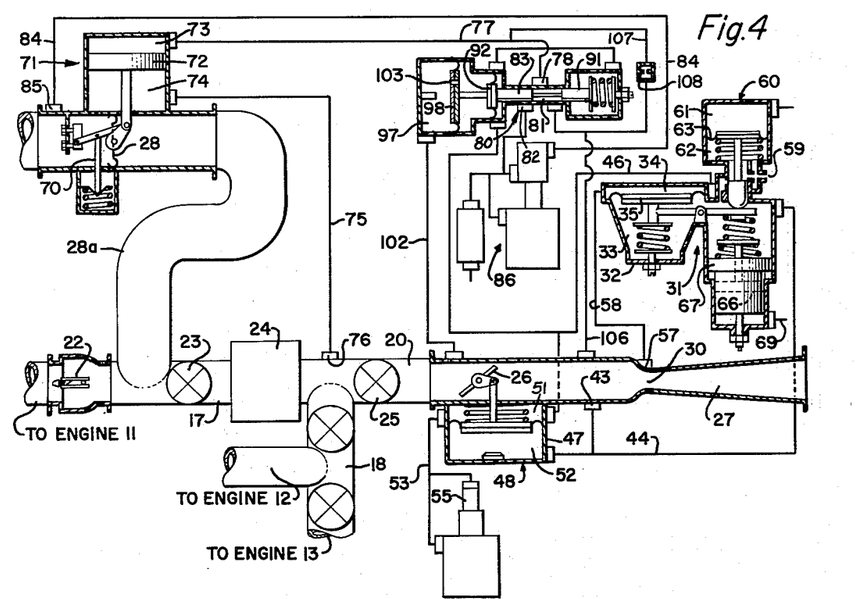
FIGS. 4 and 5 are schematic diagrams of the air supply system, showing the positions of the controls for two different operating conditions.
Figure 5:
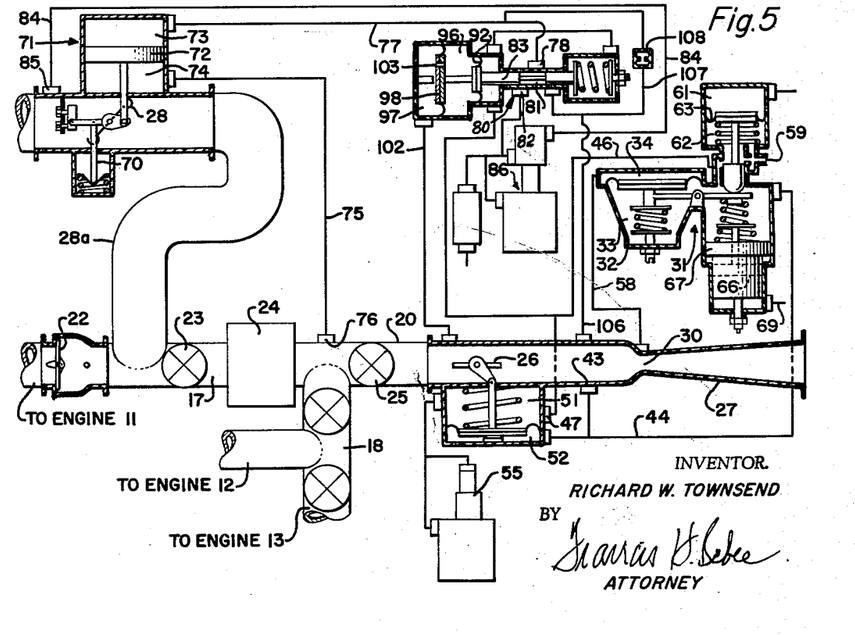

It will be understood that the large diaphragm 98, of the differential pressure control device 80, constitutes an anticipator diaphragm to initiate the opening of the high-pressure control valve 28 when there is a rapid reduction of pressure immediately upstream of the control valve 26. During normal functioning with the air supply coming from the eighth stage of the compressor, the parts of the differential pressure control device 80 will all be in the positions shown in FIG. 4. In such positions, the upper chamber 73 of the high-spool valve actuator 71 will be subjected to the pressure conditions existing immediately upstream of the Venturi 27 (or immediately downstream of valve 26) through a conduit 106 which connects such upstream side of the Venturi with the modulating valve chamber 81, and thence into conduit 77 through port 78. Even though the valve 83 is not in the FIG. 4 position, it will be noted that the pressure condition sensed by conduit 106 will be transmitted to the actuator chamber 73 through a bypass conduit 107 having an orifice 108 therein, as shown in FIGS. 3, 4 and 5. Chamber 74 is directly connected at all times to the upstream pressure condition existing between the modulating valve 26 and the high-spool supply conduit, through the sensing port 76 and the conduit 75. It will be understood that the pressure in lower chamber 74 will be greater than the pressure in chamber 73 when valve 26 is modulating. Thus, the pressure differential on the piston 72, together with the spring plunger 70, will maintain the high-spool valve 28 in the closed position when the eighth-stage pressure is normal and the parts are in their FIG. 4 positions.

Let it now be assumed that some flight condition affects the eighth-stage pressure supply and thereby causes a rapid reduction of pressure immediately upstream of the modulating valve 26. Such a pressure reduction will immediately be transmitted through the conduit 102 to chamber 97, and, due to the force of spring 88, cause diaphragm 98 to move to the left to the position shown in FIG. 5. This will permit the high pressure from the sixteenth stage to flow through port 85 and conduit 84, and regulator 86 to valve chamber 81, thence into conduit 77 and chamber 73, thereby causing the piston 72 to move downwardly and open valve 28, as shown in FIG. 5.

Under these conditions, the high-spool valve admits sufficient high-pressure air to the system to make up the deficiency in eighth-stage pressure. There will be conditions, however, when the air flow for the entire system will be supplied entirely from the high-spool bleed source; and when this occurs, the check valve 22 closes (FIG. 5) so as to prevent the air pressure from feeding back into the eighth stage. An increase in engine pressure from this condition has no particular effect except that the high-spool valve 28 will modulate nearer the closed position maintaining the pressure, upstream from the Venturi sensor 27 and modulating valve 26, nearly constant. As soon as the eighth-stage pressure exceeds this constant pressure, however, the check valve 22 will be forced open slightly and will cause the upstream pressure in main supply conduit 20 to rise. The Venturi 27 would then sense such an increase in the upstream pressure, with an associated increase in mass flow, and would cause the valve 26 to close a small amount. Such movement of the butterfly valve 26 will slightly alter the pressure differential on the large diaphragm 98, causing said diaphragm to move toward the right. This tends to move valve 83 back toward the FIG. 4 position and ultimately causes the high-spool valve 28 to move slightly toward the closed position. Then, as eighth-stage pressure builds up, the upstream pressure increases and causes diaphragm 98 to move further to the right, and finally back to the FIG. 4 position.

Lower chamber 74 of the high-spool valve actuator 71 also directly senses the increased eighth-stage pressure through conduit 75, and since such pressure is then higher than the Venturi inlet pressure (which is connected to upper chamber 73), valve 28 will ultimately close completely. It will be understood that modulation from the high-pressure stage to the eighth-stage pressure source will thus be gradual, and the controls are designed so that a change of several pounds per square inch in eighth-stage pressure will be required to make a complete transition.

I claim:

1. Apparatus for controlling the supply of bleed air in accordance with predetermined requirements to a main supply duct from a jet engine having intermediate and high-pressure compressor stages connected to the duct, comprising:
    (a) a first valve for controlling the flow from the high-pressure stage into the main supply duct;
    (b) means for maintaining said first valve in a normally closed position;
    (c) a second valve for controlling the air flow from the intermediate stage into the main supply duct;
    (d) a flow sensor in the main supply duct downstream of said valves and having servo means associated therewith to actuate said second valve to allow air flow from the intermediate stage in accordance with the predetermined requirements, such servo means including means for adjusting said air flow to compensate for changes in downstream pressure; and
    (e) means for opening the normally closed first valve from the high-pressure stage when the air flow supplied by the intermediate pressure stage is insufficient for the predetermined requirements.

2. In combination with a jet engine having a plurality of compressor stages, including intermediate and high-pressure stages, an air supply and control system for controlling the flow of air from the intermediate and high compressor stages to a main supply duct in accordance with predetermined requirements, comprising:
    (a) a first conduit connecting the intermediate pressure stage with the main supply duct and having a control valve therein;
    (b) a second conduit connecting the high-pressure stage with the main supply duct and having a normally closed valve therein;
    (c) flow sensing means communicating with the main supply duct;
    (d) servo means cooperating with said flow sensing means for actuating said first conduit control valve to regulate the flow from the intermediate stage in accordance with the predetermined requirements; and
    (e) means responsive to the pressure differential across said first conduit control valve for controlling the operation of said normally closed valve.

3. In combination with a jet engine having a plurality of compressor stages, including intermediate and high-pressure stages, an air supply and control system for supplying and controlling the flow of air from the intermediate and high compressor stages to a main supply duct in accordance with predetermined requirements, comprising:
    (a) a first conduit connecting the intermediate pressure stage with the main supply duct and having a control valve therein;
    (b) a second conduit connecting the high-pressure stage with the main supply duct and having a normally closed valve therein;
    (c) flow sensing means communicating with the main supply duct;
    (d) servo means cooperating with said flow sensing means for actuating said first conduit control valve to regulate the flow from the intermediate stage in accordance with the predetermined requirements, said servo means including means for compensating for changes in pressure in a predetermined portion of said first conduit; and
    (e) means responsive to the pressure differential across said first conduit control valve for controlling the operation of said normally closed valve.

4. In combination with a jet engine having a plurality of compressor stages, including intermediate and high-pressure stages, an air supply and control system for supplying and controlling the flow of air from the intermediate and high compressor stages to a main supply duct in accordance with predetermined requirements, comprising:
    (a) a first conduit connecting the intermediate pressure stage with the main supply duct and having a control valve therein;

(b) a second conduit connecting the high-pressure stage with the main supply duct and having a normally closed valve therein;

(c) flow sensing means communicating with said first conduit;

(d) servo means cooperating with said flow sensing means for actuating said first conduit control valve to regulate the flow from the intermediate stage in accordance with the predetermined requirements, said servo means including means for compensating for changes both in ambient pressure and in downstream pressure in said first conduit; and (e) means responsive to the pressure differential across said first conduit control valve for controlling the operation of said normally closed valve.

5. In a system for supplying and controlling the flow of air to a main supply duct from the intermediate and high-pressure compressor stages of a jet engine in accordance with predetermined requirements:

(a) a first conduit connecting the intermediate stage with the main supply duct and having a control valve therein and an actuator for said valve;

(b) a second conduit connecting the high-pressure stage with the main supply duct upstream of said control valve, said second conduit having a control valve therein and an actuator for said second conduit control valve which is adapted to hold said valve in closed position;

(c) flow sensing means communicating with the main supply duct and including servo means for controlling the movement of the actuator for said first conduit control valve in accordance with the predetermined air flow requirements; and (d) means responsive to a rapid drop in pressure immediately upstream of said first conduit control valve for opening said normally closed second conduit control valve.

6. In a system for supplying and controlling the flow of air to a main supply duct from the intermediate and high-pressure compressor stages of a jet engine in accordance with predetermined requirements:

(a) a first conduit connecting the intermediate stage with the main supply duct and having a control valve therein and an actuator for said valve;

(b) a second conduit connecting the high-pressure stage with the main supply duct upstream of said control valve, said second conduit having a control valve therein and an actuator for said second conduit control valve which is adapted to hold said valve in closed position;

(c) flow sensing and controlling means communicating with the main supply duct and including a Venturi meter in said duct having entrance and throat ports, and servo means for controlling the movement of the actuator for said first conduit control valve in accordance with the predetermined air flow requirements, said servo means including means responsive to the pressure differential between said entrance and throat ports for effecting movement of said actuator; and (d) means responsive to a rapid drop in pressure immediately upstream of said first conduit control valve for opening said normally closed second conduit control valve.

7. In a system for supplying and controlling the flow of air to a main supply duct from the intermediate and high-pressure compressor stages of a jet engine in accordance with predetermined requirements:

(a) a first conduit connecting the intermediate stage with the main supply duct and having a control valve therein and an actuator for said valve;

(b) a second conduit connecting the high-pressure stage with the main supply duct upstream of said control valve, said second conduit having a control valve therein and an actuator for said second conduit control valve which is adapted to hold said valve in closed position;

(c) flow sensing and controlling means communicating with the main supply duct and including servo means for controlling the movement of the actuator for said first conduit control valve in accordance with the predetermined air flow requirements; and (d) means responsive to a rapid drop in pressure immediately upstream of said first conduit control valve for opening said normally closed second conduit control valve, said last-mentioned means including a pneumatic device responsive to the pressure differential across said first conduit control valve for creating a pressure pulse which is adapted to open said normally closed second conduit control valve when there is a rapid reduction in pressure on the upstream side of said first conduit control valve.

8. In a system for supplying and controlling the flow of air to a main supply duct from the intermediate and high-pressure compressor stages of a jet engine in accordance with predetermined requirements:

(a) a first valve for controlling the flow of air from the intermediate stage into the supply duct;

(b) a second valve for controlling the flow of air from the high-pressure stage into the supply duct;

(c) flow sensing and controlling means communicating with the main supply duct for modulating the first valve in accordance with said predetermined air flow requirements; and (d) means for actuating and modulating said second valve when the air flow supplied by the intermediate pressure stage is insufficient for the predetermined air flow requirements, such actuating and modulating means including pressure responsive means for normally holding said second valve in closed position, a source of actuating pressure, and means for directing said actuating pressure to said pressure responsive means to open said second valve when the air flow from the intermediate stage reaches such insufficient condition.

9. In a system for supplying and controlling the flow of air to a main supply duct from the intermediate and high-pressure compressor stages of a jet engine in accordance with predetermined requirements:

(a) a first valve for controlling the flow of air from the intermediate stage into the main supply duct;

(b) a second valve for controlling the flow of air from the high pressure stage into the main supply duct;

(c) flow sensing and controlling means communicating with the main supply duct for modulating said first valve in accordance with the predetermined air flow requirements; and (d) means for actuating and modulating said second valve when the air flow supplied by the intermediate pressure stage is insufficient for the predetermined air flow requirements, such actuating and modulating means including pressure responsive means for normally holding said second valve in closed position, a source of actuating pressure, and means responsive to the pressure differential across said first valve for directing said actuating pressure to said pressure responsive means to open said second valve when the pressure on the upstream side of said first valve is rapidly reduced.

10. In a system for supplying and controlling the flow of air to a main supply duct from the intermediate and high-pressure compressor stages of a jet engine in accordance with predetermined requirements:

(a) a first valve for controlling the flow of air from the intermediate stage into the main supply duct;

(b) a second valve for controlling the flow of air from the high-pressure stage into the main supply duct;

(c) flow sensing and controlling means communicating with the main supply duct for modulating said first valve in accordance with the predetermined air flow requirements, said flow sensing and controlling means including means for compensating for changes in altitude and changes in downstream pressure; and (d) means for actuating and modulating said second valve when the air flow supplied by the intermediate pressure stage is insufficient for the predetermined air flow requirements.

11. In a system for supplying and controlling the flow of air to a main supply duct from the intermediate and high-pressure compressor stages of a jet engine in accordance with predetermined requirements:

(a) a first valve for controlling the flow of air from the intermediate stage into the main supply duct;

(b) a second valve for controlling the flow of air from the high-pressure stage into the main supply duct;

(c) flow sensing and controlling means communicating with the main supply duct for modulating said first valve in accordance with the predetermined air flow requirements, said flow sensing and controlling means including a pressure responsive actuator for said first valve, a Venturi meter in said duct having entrance and throat ports, means for subjecting said actuator to the pressure differential between said entrance and throat ports, and bleed means associated with said last-mentioned means for altering said pressure differential to compensate for changes in the altitude at which the jet engine is operating; and (d) means for actuating and modulating said second valve when the air flow supplied by the intermediate pressure stage is insufficient for the predetermined air flow requirements.

12. In a system for supplying and controlling the flow of air to a main supply duct from the intermediate and high-pressure compressor stages of a jet engine in accordance with predetermined requirements:

(a) a first valve for controlling the flow of air from the intermediate stage into the main supply duct;

(b) a second valve for controlling the flow of air from the high-pressure stage into the main supply duct;

(c) flow sensing and controlling means communicating with the main supply duct for modulating said first valve in accordance with the predetermined air flow requirements, said flow sensing and controlling means including a pressure responsive actuator for said first valve, a Venturi meter in said duct having entrance and throat ports, means for subjecting said actuator to the pressure differential between said entrance and throat ports, and bleed means associated with said last-mentioned means for altering said pressure differential to compensate for changes in pressure downstream of said Venturi meter; and (d) means for actuating and modulating said second valve when the air flow supplied by the intermediate pressure stage is insufficient for the predetermined air flow requirements.

13. In a system for supplying and controlling the flow of air to a main supply duct from the intermediate and high-pressure compressor stages of a jet engine in accordance with predetermined requirements:

(a) a first valve for controlling the flow of air from the intermediate stage into the main supply duct;

(b) a second valve for controlling the flow of air from the high-pressure stage into the main supply duct;

(c) flow sensing and controlling means communicating with the main supply duct for modulating said first valve in accordance with the predetermined air flow requirements; and (d) means for actuating and modulating said second valve when the air flow supplied by the intermediate pressure stage is insufficient for the predetermined air flow requirements, such actuating and modulating means including pressure responsive means for normally holding said second valve in closed position, a metering valve, means for connecting the high-pressure stage to said metering valve and said metering valve to said pressure responsive means, and means for actuating said metering valve to direct the high pressure into said pressure responsive means when the air flow from the intermediate stage reaches such insufficient condition.

14. In a system for supplying and controlling the flow of air to a main supply duct from the intermediate- and high-pressure compressor stages of a jet engine in accordance with predetermined requirements:

(a) a first valve communicating with the main supply duct for modulating air flow thereto;

(b) flow sensing means communicating with the main supply duct downstream of said first valve, said flow sensing means having means communicating therewith responsive to the rate of air flow through the main supply duct to control the operation of said first valve;

(c) a second valve between the high-pressure compressor stage and the main supply duct upstream of said first valve, said second valve being normally closed; and (d) means responsive to predetermined variations in the pressure differential between the upstream and downstream sides of said first valve to adjust said second valve to modulate air flow from the high-pressure compressor stage to the main supply duct.

15. In a system for supplying and controlling the flow of air to a main supply duct from the intermediate- and high-pressure compressor stages of a jet engine in accordance with predetermined requirements:

(a) a first valve communicating with the main supply duct for modulating air flow thereto;

(b) flow sensing means communicating with the main supply duct downstream of said first valve, said flow sensing means having means communicating therewith responsive to the rate of air flow to the main supply duct to control the operation of said first valve;

(c) means responsive to changes in altitude to modify the operation of said first valve controlling means;

(d) a second valve between the high-pressure compressor stage and the main supply duct upstream of said first valve, said second valve being normally closed; and (e) means responsive to predetermined variations in the pressure differential between the upstream and downstream sides of said first valve to adjust said second valve to modulate air flow from the high-pressure compressor stage to the main supply duct.

16. In a system for supplying and controlling the flow of air to a main supply duct from the intermediate- and high-pressure compressor stages of a jet engine in accordance with predetermined requirements:

(a) a first valve communicating with the main supply duct for modulating air flow thereto;

(b) flow sensing means communicating with the main supply duct downstream of said first valve, said flow sensing means having means communicating therewith responsive to the rate of air flow to the main supply duct to control the operation of said first valve;

(c) a second valve between the high-pressure compressor stage and the main supply duct upstream of said first valve, said second valve being normally closed;

(d) actuating means for said second valve; and (e) a servo means responsive to variations in a pressure differential between the upstream and downstream sides of said first valve to effect the operation of the actuating means for said second valve to modulate air flow from the high-pressure compressor stage to the main supply duct.

17. In a system for supplying and controlling the flow of air to a main supply duct from the intermediate- and high-pressure compressor stages of a jet engine in accordance with predetermined requirements:

(a) a first valve communicating with the main supply duct for modulating air flow thereto;
(b) flow sensing means communicating with the main supply duct downstream of said first valve, said flow sensing means having means communicating therewith responsive to the rate of air flow to the main supply duct to control the operation of said first valve;
(c) a second valve between the high-pressure compressor stage and the main supply duct upstream of said first valve, said second valve being normally closed;
(d) actuating means for said second valve;
(e) servo means responsive to variations in a pressure differential between the upstream and downstream sides of said first valve to effect the operation of the actuating means for said second valve to modulate air flow from the high-pressure compressor stage to the main supply duct; and
(f) means forming a part of said servo means for amplifying pressure variation signals and effecting rapid operation of said second valve actuating means in anticipation of changes in air flow in the main supply duct due to variations in engine operation.

18. In a system for supplying and controlling the flow of air to a main supply duct from the intermediate- and high-pressure compressor stages of a jet engine in accordance with predetermined requirements:
(a) a first valve communicating with the main supply duct for modulating air flow thereto;
(b) flow sensing means communicating with the main supply duct downstream of said first valve, said flow sensing means having means communicating therewith responsive to the rate of air flow to the main supply duct to control the operation of said first valve;
(c) means responsive to changes in altitude to modify the operation of said first valve controlling means;
(d) a second valve between the high-pressure compressor stage and the main supply duct upstream of said first valve, said second valve being normally closed;
(e) actuating means for said second valve;
(f) servo means responsive to variations in a pressure differential between the upstream and downstream sides of said first valve to effect the operation of the actuating means for said second valve to modulate air flow from the high-pressure compressor stage to the main supply duct; and
(g) means forming a part of said servo means for amplifying pressure variation signals and effecting rapid operation of said second valve actuating means in anticipation of changes in air flow to the main supply duct due to variations in engine operation.

19. In a system for supplying and controlling the flow of air to a main supply duct from the intermediate- and high-pressure compressor stages of a jet engine in accordance with predetermined requirements:
(a) a first valve communicating with the main supply duct for modulating air flow thereto;
(b) a fluid pressure responsive actuator connected with said first valve for effecting the operation thereof;
(c) fluid flow sensing means in said main supply duct downstream of said first valve and having a Venturi tube for creating pressure differentials in response to fluid flow to the main supply duct;
(d) control means communicating with said Venturi tube, the supply duct, and said fluid pressure responsive actuator to govern the operation of said actuator in response to pressure differential variations;
(e) a second valve between the high-pressure compressor stage and the main supply duct at the upstream side of said first valve;
(f) actuating means for said second valve; and
(g) servo means responsive to variations in a pressure differential between the upstream and downstream sides of said first valve to effect the operation of the actuating means for said second valve to modulate air flow from the high-pressure compressor stage to the main supply duct, a predetermined pressure differential between the upstream and downstream sides of said first valve causing said servo means to maintain said second valve actuating means in a valve closing position.

20. In a system for supplying and controlling the flow of air to a main supply duct from the intermediate- and high-pressure compressor stages of a jet engine in accordance with predetermined requirements:
(a) a first valve communicating with the main supply duct for modulating air flow thereto;
(b) a check valve upstream of said first valve to prevent flow from the main duct toward the intermediate compressor stage;
(c) a branch duct for conducting air from the high-pressure compressor stage to the main supply duct between said first and check valves;
(d) fluid flow sensing means communicating with the main supply duct downstream of said first valve and having a Venturi tube for creating pressure differentials in response to fluid flow to the main supply duct;
(e) fluid pressure responsive actuating means connected with said first valve for effecting the operation thereof;
(f) control means communicating with said Venturi tube, the supply duct and said fluid pressure responsive actuator to govern the operation of said actuator in response to pressure differential variations;
(g) a second valve in said branch duct to control air flow from the high-pressure compressor stage to the main supply duct;
(h) fluid pressure responsive actuating means connected with said second valve for effecting the operation thereof; and
(i) servo means responsive to variations in a pressure differential between the upstream and downstream sides of said first valve to effect the operation of the actuating means for said second valve to modulate air flow from the high-pressure compressor stage to the main supply duct, a predetermined pressure differential between the upstream and downstream sides of said first valve causing said servo means to maintain said second valve actuating means in a valve closing position.

21. In a system for supplying and controlling the flow of air to a main supply duct from the intermediate- and high-pressure compressor stages of a jet engine in accordance with predetermined requirements:
(a) a first valve communicating with the main supply duct for modulating air flow thereto;
(b) a fluid pressure responsive actuator connected with said first valve for effecting the operation thereof;
(c) fluid flow sensing means communicating with the main supply duct downstream of said first valve and having a Venturi tube for creating pressure differentials in response to fluid flow to the main supply duct;
(d) control means communicating with said Venturi tube, the supply duct and said fluid pressure responsive actuator to govern the operation of said actuator in response to pressure differential variations, said control means having means responsive to pressure changes in a portion of the main supply duct relative to cabin air pressure to vary the operation of said control means;
(e) a second valve between the high-pressure compressor stage and said main supply duct at the upstream side of the first valve;
(f) actuating means for said second valve; and
(g) servo means responsive to variations in a pressure differential between the upstream and downstream sides of said first valve to effect the operation of the actuating means for said second valve to modulate air flow from said high-pressure compressor stage to the main supply duct, a predetermined pressure differential between the upstream and downstream sides of said first valve causing said servo means to maintain said second valve actuating means in a valve closing position.

22. Apparatus for controlling the flow of bleed air from a jet engine having intermediate and high-pressure compressor stages to the main supply duct of a compartment air conditioning and pressurization system, comprising:
   (a) means forming a duct portion for establishing communication between the intermediate and high-pressure compressor stages of the engine and the main supply duct;
   (b) a first valve in said duct portion for controlling the flow from the high-pressure stage into said duct portion;
   (c) means for maintaining said first valve in a normally closed position;
   (d) a second valve in said duct portion for modulating air flow therethrough to the main supply duct;
   (e) flow sensing means connected with said duct forming means and having means communicating with said duct portion responsive to pressure differentials in spaced parts of said duct portion to control the operation of said second valve; and
   (f) means responsive to predetermined change in pressure in a part of said duct portion to open the normally closed first valve to admit air from the high-pressure compressor stage of the engine to said duct portion.

23. Apparatus for controlling the flow of bleed air from a jet engine having intermediate and high-pressure compressor stages to the main supply duct of a compartment air conditioning and pressurization system, comprising:
   (a) means forming a duct portion for establishing communication between the intermediate and high-pressure compressor stages of the engine and the main supply duct;
   (b) a first valve in said duct portion for controlling the flow from the high-pressure stage into said duct portion;
   (c) means for maintaining said first valve in a normally closed position;
   (d) a second valve in said duct portion for modulating air flow therethrough to the main supply duct;
   (e) flow sensing means connected with said duct forming means and having means communicating with said duct portion responsive to pressure differentials in spaced parts of said duct portion to control the operation of said second valve; and
   (f) means responsive to a reduction in pressure in said duct portion upstream of said second valve to open the normally closed first valve to admit air from the high-pressure compressor stage of the engine to said duct portion.

24. Apparatus for controlling the flow of bleed air from a jet engine having intermediate and high-pressure compressor stages to the main supply duct of a compartment air conditioning and pressurization system, comprising:
   (a) means forming a duct portion for establishing communication between the intermediate and high-pressure compressor stages of the engine and the main supply duct;
   (b) a first valve in said duct portion for controlling the flow from the high-pressure stage into said duct portion;
   (c) means for maintaining said first valve in a normally closed position;
   (d) a second valve in said duct portion for modulating air flow therethrough to the main supply duct;
   (e) flow sensing means connected with said duct forming means and having means communicating with said duct portion responsive to pressure differentials in spaced parts of said duct portion to control the operation of said second valve;
   (f) means responsive to changes in altitude to modify the operation of said second valve controlling means; and
   (g) means responsive to a reduction in pressure in said duct portion upstream of said second valve to open the normally closed first valve to admit air from the high-pressure compressor stage of the engine to said duct portion.

References Cited by the Examiner
UNITED STATES PATENTS

| | | | |
|---|---|---|---|
| 2,295,775 | 9/42 | Crittenden | 230—18 |
| 2,734,356 | 2/56 | Kleinhaus | 98—1.5 |
| 2,947,317 | 8/60 | Towler | 103—11 |

ROBERT A. O'LEARY, *Primary Examiner.*

MEYER PERLIN, *Examiner.*